United States Patent
Kato et al.

(10) Patent No.: US 11,878,596 B2
(45) Date of Patent: Jan. 23, 2024

(54) NON-CONTACT CHARGING SYSTEM AND VEHICLE

(71) Applicant: HONDA MOTOR CO., LTD., Tokyo (JP)

(72) Inventors: Hisahiro Kato, Wako (JP); Naoya Sakakibara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 314 days.

(21) Appl. No.: 17/198,957

(22) Filed: Mar. 11, 2021

(65) Prior Publication Data

US 2021/0291672 A1 Sep. 23, 2021

(30) Foreign Application Priority Data

Mar. 18, 2020 (JP) ................. 2020-047637

(51) Int. Cl.
| | |
|---|---|
| *B60L 53/12* | (2019.01) |
| *G06F 21/31* | (2013.01) |
| *H02J 7/02* | (2016.01) |
| *H02J 7/00* | (2006.01) |
| *B60L 53/66* | (2019.01) |

(52) U.S. Cl.
CPC ............. *B60L 53/12* (2019.02); *B60L 53/66* (2019.02); *G06F 21/31* (2013.01); *H02J 7/00045* (2020.01); *H02J 7/02* (2013.01); *G06F 2221/2117* (2013.01)

(58) Field of Classification Search
CPC .......... B60L 53/12; B60L 53/66; G06F 21/31; H02J 7/00045; H02J 7/02
See application file for complete search history.

(56) References Cited

U.S. PATENT DOCUMENTS

2009/0085522 A1\* 4/2009 Matsumoto ........... B60W 10/26
320/137

FOREIGN PATENT DOCUMENTS

| JP | 2009-89452 A | 4/2009 |
|---|---|---|
| JP | 6015632 B2 | 10/2016 |

\* cited by examiner

*Primary Examiner* — Richard V Muralidar
(74) *Attorney, Agent, or Firm* — WHDA, LLP

(57) ABSTRACT

A power-transmitting unit starts transmitting power to a power-receiving unit in a vehicle if (1-1) operation information represents a parking operation of the vehicle and/or (2-1) intention information represents that a user of the vehicle intends to get off the vehicle, and (3) authentication information represents that the user of the vehicle is a registered user. The power-transmitting unit stops transmitting the power to the power-receiving unit if (1-2) the operation information represents a start operation of running of the vehicle and/or (2-2) the intention information represents that the user of the vehicle intends to get in the vehicle, and (3) the authentication information represents that the user of the vehicle is the registered user.

10 Claims, 4 Drawing Sheets

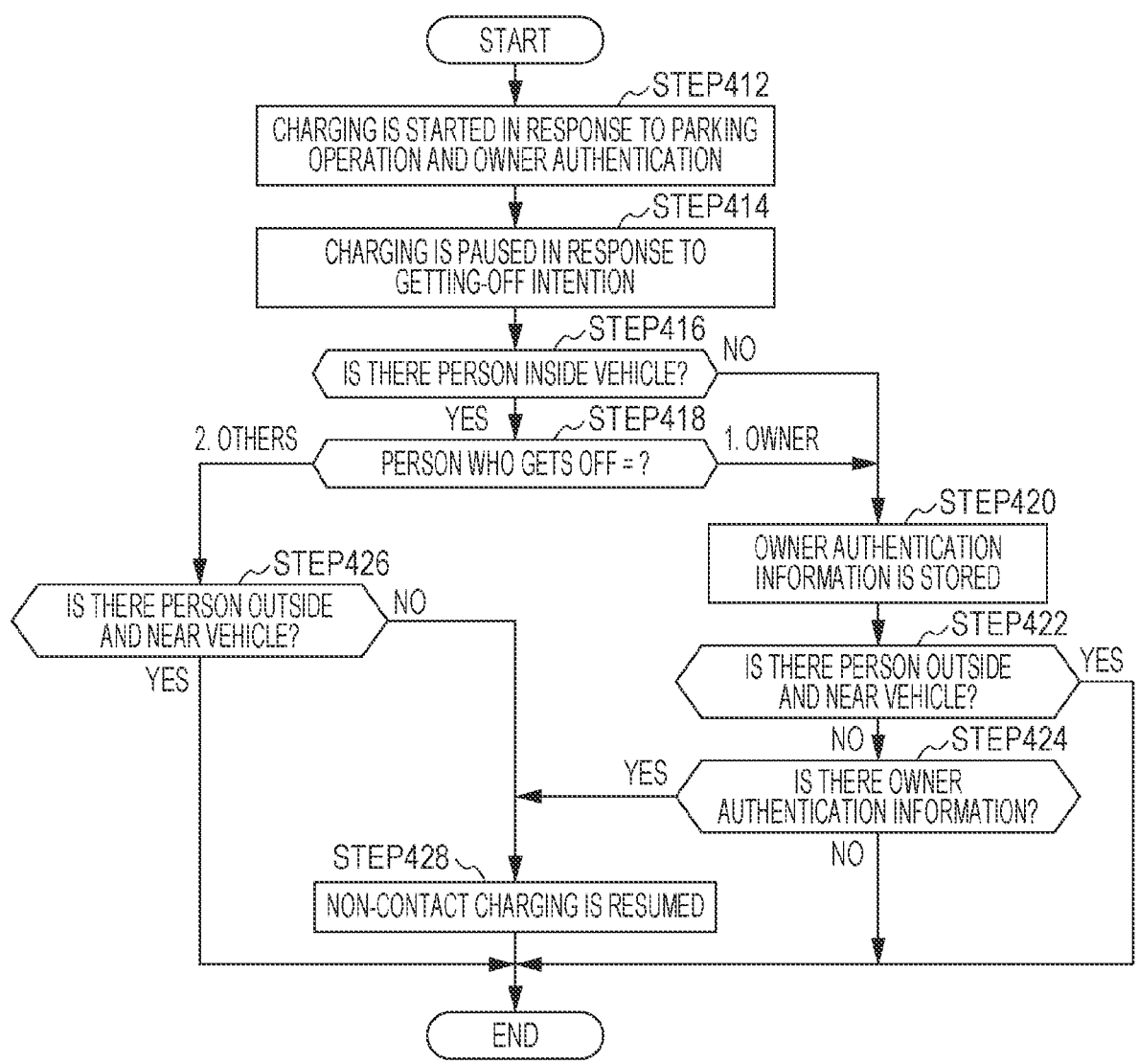

NON-CONTACT CHARGING SYSTEM AND VEHICLE

CROSS REFERENCES TO RELATED APPLICATIONS

The present application claims priority under 35 U.S.C. § 119 to Japanese Patent Application No. 2020-047637, filed Mar. 18, 2020, entitled "Non-contact Charging System and Vehicle." The contents of this application are incorporated herein by reference in their entirety.

TECHNICAL FIELD

The present disclosure relates to a system that charges a vehicle-mounted battery in a non-contact manner and a vehicle.

BACKGROUND

In a technical method proposed as for a shift-by-wire (SBW) shifter, power transmission starts when a parking range is detected, and the power transmission ends when one other than the parking range is detected (for example, see Japanese Patent No. 6015632).

In another proposed technical method, charging of a battery starts when a driver moves away from a vehicle, and charging of the battery ends when the driver approaches the vehicle (for example, see Japanese Unexamined Patent Application Publication No. 2009-089452).

SUMMARY

When non-contact charging of a vehicle-mounted battery starts, however, it is necessary to select charging equipment and to perform an operation for the start of charging, and there is a possibility that a user of a vehicle feels an operation to be complicated. If the user forgets performing the operation, charging of the vehicle-mounted battery may also be forgotten. In the case where charging of the vehicle-mounted battery automatically starts or stops in accordance with the operation and settings of the vehicle, user authentication is not needed, and even a third person (for example, a person who illegally obtains the vehicle) other than the user can charge the vehicle-mounted battery.

The present application describes, for example, a non-contact charging system that is capable of automatically starting or stopping non-contact charging of a vehicle-mounted battery in response to the intention of a correct user of a vehicle who intends to get in or get off the vehicle.

A non-contact charging system according to one aspect of the present disclosure includes a power-transmitting unit that transmits power to a power-receiving unit mounted on a vehicle in a non-contact manner for charging a battery mounted on the vehicle, an information-obtaining unit that obtains, in a state in which the vehicle is stopped at a location at which the power-transmitting unit is installed, at least one of operation information and intention information, the operation information representing an operation of a user of the vehicle for parking or start of running of the vehicle, the intention information representing intention of the user of the vehicle reflected on an action for getting off or getting in the vehicle, and authentication information for authenticating the user of the vehicle, and a charging control device that causes, based on at least one of the operation information and the intention information, and the authentication information which are obtained by the information-obtaining unit, the power-transmitting unit to start transmitting the power to the power-receiving unit if the operation information represents a parking operation of the vehicle, the intention information additionally or alternatively represents that the user of the vehicle intends to get off the vehicle, and the authentication information represents that the user of the vehicle is a registered user, the charging control device causing, based on at least one of the operation information and the intention information, and the authentication information which are obtained by the information-obtaining unit, the power-transmitting unit to stop transmitting the power to the power-receiving unit if the operation information represents a start operation of running of the vehicle, the intention information additionally or alternatively represents that the user of the vehicle intends to get in the vehicle, and the authentication information represents that the user of the vehicle is the registered user.

As for the non-contact charging system having the structure described above, the power-transmitting unit starts transmitting the power to the power-receiving unit of the vehicle if, in a state in which the vehicle is stopped at the location at which the power-transmitting unit is installed, (1-1) the operation information represents the parking operation of the vehicle and/or (2-1) the intention information represents that the user of the vehicle intends to get off the vehicle, and (3) the authentication information represents that the user of the vehicle is the registered user.

The power-transmitting unit stops transmitting the power to the power-receiving unit if, in a state in which the vehicle is stopped at the location at which the power-transmitting unit is installed, (1-2) the operation information represents the start operation of running of the vehicle and/or (2-2) the intention information represents that the user of the vehicle intends to get in the vehicle, and (3) the authentication information represents that the user of the vehicle is the registered user.

The authentication information ensures that the intention of the registered user of the vehicle is reflected on the operation information and/or the intention information. Accordingly, the number of operations performed by the user decreases, charging of the battery mounted on the vehicle is prevented from being forgotten, an unregistered third person is forbidden from controlling charging of the battery, and the convenience of the non-contact charging system is consequently improved.

In the non-contact charging system, the information-obtaining unit preferably obtains at least one of the operation information and the intention information, the operation information representing that the vehicle is parked or in preparation for the start of running, the intention information representing a distance between the vehicle and a smart key that is carried by the user of the vehicle and/or representing whether the user is in a cabin space of the vehicle, and the authentication information representing that the user of the vehicle is the registered user and representing security information for preventing the vehicle from being stolen. The charging control device preferably causes, based on at least one of the operation information and the intention information, and the authentication information which are obtained by the information-obtaining unit, the power-transmitting unit to start transmitting the power to the power-receiving unit if the operation information represents that the vehicle is parked, the intention information additionally or alternatively represents that the distance is equal to or more than a predetermined distance and/or represents that no user is in the cabin space of the vehicle, and the authentication information represents that the user of the vehicle is the registered user and/or represents that the security information is correct, and the charging control device preferably causes, based on at least one of the operation information and the intention information and the authentication information which are obtained by the information-obtaining unit, the power-transmitting unit to stop transmitting the power to the power-receiving unit if the operation information represents that the vehicle starts running, the intention information additionally or alternatively represents that the distance is less than a predetermined distance and/or represents that the user is in the cabin space of the vehicle, and the authentication information represents that the user of the vehicle is correct and/or represents that the security information is correct.

As for the non-contact charging system having the structure described above, the power-transmitting unit starts transmitting the power to the power-receiving unit of the vehicle if (1-1) the operation information represents that the vehicle is parked, and/or the intention information represents (2-1-1) that the distance between the vehicle and the smart key that is carried by the user is equal to or more than the predetermined distance and/or represents (2-1-2) that no user is in the cabin space of the vehicle, and the authentication information represents (3-1) that the user of the vehicle is the registered user and/or represents (3-2) that the security information is correct.

The power-transmitting unit stops transmitting the power to the power-receiving unit if (1-2) the operation information represents that the vehicle starts running and/or the intention information represents (2-2-1) that the distance between the vehicle and the smart key that is carried by the user is less than the predetermined distance and/or represents (2-2-2) that the user is in the cabin space of the vehicle, and the authentication information represents (3-1) that the user of the vehicle is correct and/or represents (3-2) that the security information is correct.

The security information and/or registered user information included in the authentication information ensures that the intention of the registered user of the vehicle is reflected on vehicle state information included in the operation information and smart key information and/or occupant detection information included in the intention information. Accordingly, the number of operations performed by the user decreases, charging of the battery mounted on the vehicle is prevented from being forgotten, an unregistered third person is forbidden from controlling charging of the battery, and the convenience of the system is consequently improved.

In the non-contact charging system having the above structure, the charging control device preferably includes a charging efficiency calculator that detects an amount of power transmitted by the power-transmitting unit and an amount of power received by the power-receiving unit and calculates charging efficiency based on the amount of the power transmitted by the power-transmitting unit and the amount of the power received by the power-receiving unit, and an occupant-presuming unit that presumes, based on an aspect of temporal variation in the charging efficiency calculated by the charging efficiency calculator, whether the user of the vehicle gets in or gets off the vehicle and/or whether the user is in the cabin space of the vehicle. The charging control device preferably variably controls, based on a result of presumption of the occupant-presuming unit, the amount of power that the power-transmitting unit transmits to the power-receiving unit.

As for the non-contact charging system having the structure described above, whether the vehicle body shakes itself or the magnitude thereof is reflected on the aspect of the temporal variation in the charging efficiency (a coupling coefficient). In view of this, whether an occupant of the vehicle gets off or gets in the vehicle and/or whether the occupant is in the cabin space of the vehicle is presumed. When the aspect of the temporal variation in the charging efficiency is unstable, and it is presumed that the occupant of the vehicle is getting off or getting in the vehicle, or the occupant is in the cabin space of the vehicle, the amount of the power to be transmitted can be decreased. When the aspect of the temporal variation in the charging efficiency is stable, and it is presumed that the occupant of the vehicle is not getting off or getting in the vehicle, or no occupants are in the cabin space of the vehicle, the amount of the power to be transmitted can be increased. This improves the charging efficiency.

A vehicle according to one aspect of the present disclosure includes a battery, a power-receiving unit that receives power in a non-contact manner for charging the battery from a power-transmitting unit installed at a designated location, an information-providing unit that provides, in a state in which the vehicle is stopped at a location at which the power-transmitting unit is installed, a non-contact charging system that includes the power-transmitting unit with at least one of operation information and intention information, the operation information representing an operation of a user of the vehicle for parking or start of running of the vehicle, the intention information representing intention of the user of the vehicle reflected on an action for getting off or getting in the vehicle, and authentication information for authenticating the user of the vehicle, and a vehicle-mounted control device that causes the power-receiving unit to start receiving the power if the operation information represents a parking operation of the vehicle, the intention information additionally or alternatively represents that the user of the vehicle intends to get off the vehicle, and the authentication information represents that the user of the vehicle is a registered user, the vehicle-mounted control device causing the power-receiving unit to stop receiving the power if the operation information represents a start operation of running of the vehicle, the intention information additionally or alternatively represents that the user of the vehicle intends to get in the vehicle, and the authentication information represents that the user of the vehicle is the registered user.

As for the vehicle having the structure described above, the power-transmitting unit starts transmitting the power to the power-receiving unit of the vehicle if, in a state in which the vehicle is stopped at the location at which the power-transmitting unit is installed, (1-1) the operation information represents the parking operation of the vehicle and/or (2-1) the intention information represents that the user of the vehicle intends to get off the vehicle, and (3) the authentication information represents that the user of the vehicle is the registered user.

The power-transmitting unit stops transmitting the power to the power-receiving unit if, in a state in which the vehicle is stopped at the location at which the power-transmitting unit is installed, (1-2) the operation information represents the start operation of running of the vehicle and/or (2-2) the intention information represents that the user of the vehicle intends to get in the vehicle, and (3) the authentication information represents that the user of the vehicle is the registered user.

The authentication information ensures that the intention of the registered user of the vehicle is reflected on the operation information and/or the intention information. Accordingly, the number of operations performed by the user decreases, charging of the battery that is mounted on the vehicle is prevented from being forgotten, an unregistered third person is forbidden from controlling charging of the battery, and the convenience of the vehicle is consequently improved.

BRIEF DESCRIPTION OF THE DRAWINGS

The advantages of the disclosure will become apparent in the following description taken in conjunction with the following drawings.

FIG. 6 is a flowchart illustrating the start and stop of charging of the non-contact charging system according to another embodiment.

DESCRIPTION OF THE PREFERRED EMBODIMENTS

Structure
Structure of Non-Contact Charging System

Figure 1:
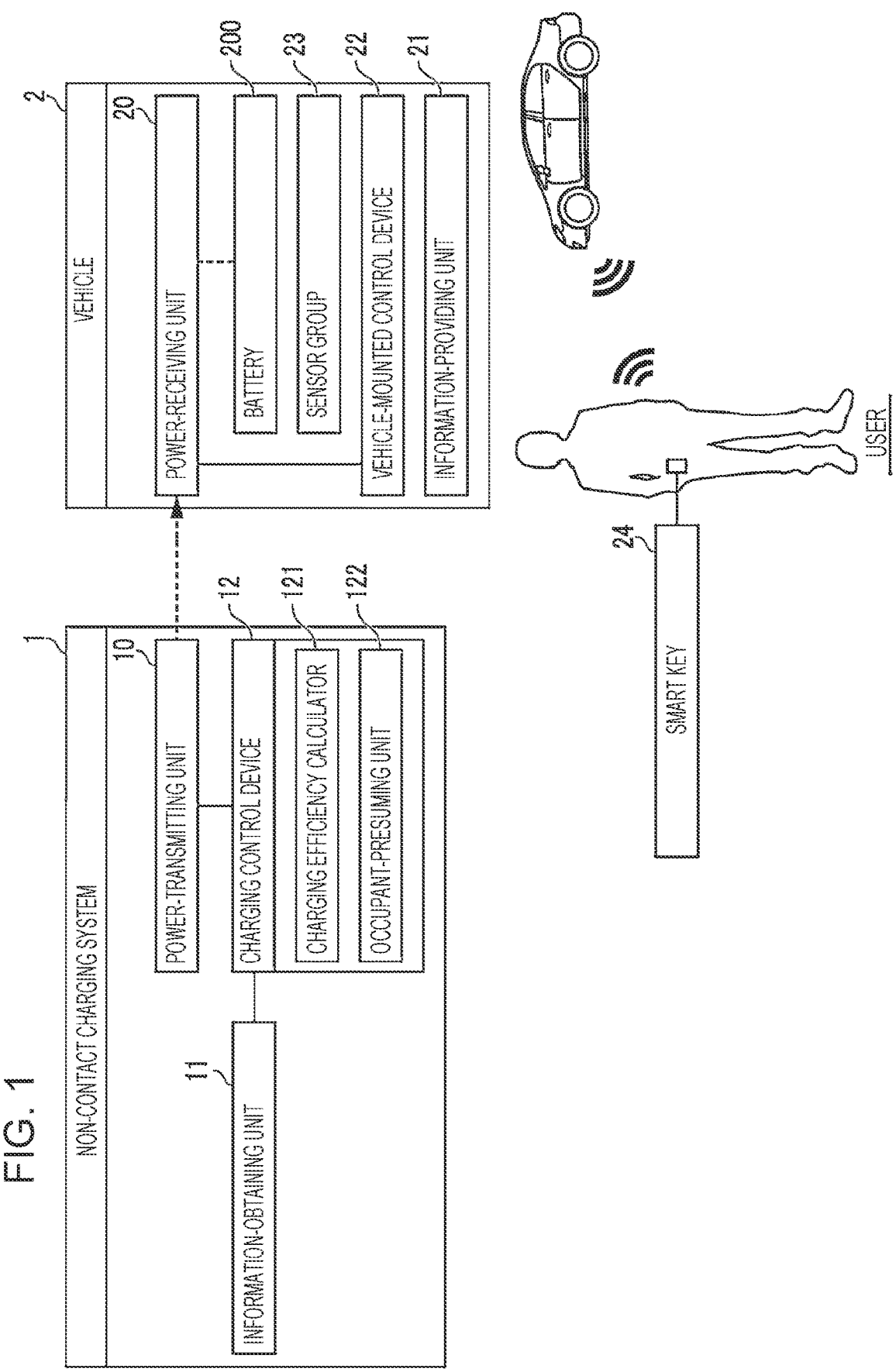
FIG. 1 illustrates the structure of a non-contact charging system and a vehicle according to an embodiment of the present disclosure.

A non-contact charging system 1 according to an embodiment of the present disclosure illustrated in FIG. 1 includes a power-transmitting unit 10, an information-obtaining unit 11, and a charging control device 12.

The power-transmitting unit 10 transmits power to a power-receiving unit 20 mounted on a vehicle 2 in a non-contact manner for charging a battery 200 mounted on the vehicle 2. The power-transmitting unit 10 is installed, for example, in a parking space for the vehicle 2.

The information-obtaining unit 11 receives various kinds of information (the detail thereof will be described later) transmitted from a vehicle-mounted control device 22 in the vehicle 2 by wireless communication.

The charging control device 12 controls the power transmission operation of the power-transmitting unit 10, based on various kinds of information obtained by the information-obtaining unit 11. The charging control device 12 includes a charging efficiency calculator 121 and an occupant-presuming unit 122. The charging efficiency calculator 121 detects the amount of power that is transmitted by the power-transmitting unit 10 and the amount of power that is received by the power-receiving unit 20 and calculates charging efficiency, based on the amount of the power that is transmitted by the power-transmitting unit 10 and the amount of the power that is received by the power-receiving unit 20. The occupant-presuming unit 122 presumes whether a user of the vehicle 2 gets in or gets off the vehicle and/or whether the user is in a cabin space of the vehicle 2, based on an aspect of temporal variation in the charging efficiency that is calculated by the charging efficiency calculator 121.

The charging control device 12 and the charging efficiency calculator 121 and the occupant-presuming unit 122 that are included in the charging control device 12 include a storage device (for example, a HDD, a memory, or a SSD that includes the same), and an arithmetic processing unit (for example, a CPU, a single-core processor, or a multi-core processor) that reads data and a program (software) that are needed from the storage device and that performs an arithmetic process on the data in accordance with the program.
Structure of Vehicle The vehicle 2 illustrated in FIG. 1 includes the power-receiving unit 20, an information-providing unit 21, the vehicle-mounted control device 22, a sensor group 23, and the battery 200.

The power-receiving unit 20 receives power in a non-contact manner for charging the battery 200 from the power-transmitting unit 10 that is installed at a designated location. The battery 200 includes, for example, a lithium-ion secondary battery. The information-providing unit 21 wirelessly transmits various kinds of information such as an output signal of the sensor group 23 or the result of the arithmetic process based on the output signal to the information-obtaining unit 11 of the non-contact charging system 1.

The vehicle-mounted control device 22 appropriately controls the operations of components of the vehicle 2 in response to the output signals of various sensors (for example, a position sensor for a shifter, an imaging device that images the state of the cabin space, and a pressure-sensitive sensor of a seat) that are included in the sensor group 23. The vehicle-mounted control device 22 has a function of wireless communication with a smart key 24 that is carried by the user of the vehicle 2.

The vehicle-mounted control device 22 includes, as in the charging control device 12, a storage device (for example, a HDD, a memory, or a SSD that includes the same), and an arithmetic processing unit (for example, a CPU, a single-core processor, or a multi-core processor) that reads data and a program (software) that are needed from the storage device and that performs an arithmetic process on the data in accordance with the program.
Function Function of Starting Charging (First Embodiment)

A first embodiment of the function of starting charging of the battery 200 of the vehicle 2 performed by the non-contact charging system 1 having the structure described above will be described with reference to a flowchart in FIG. 2.

Figure 2:
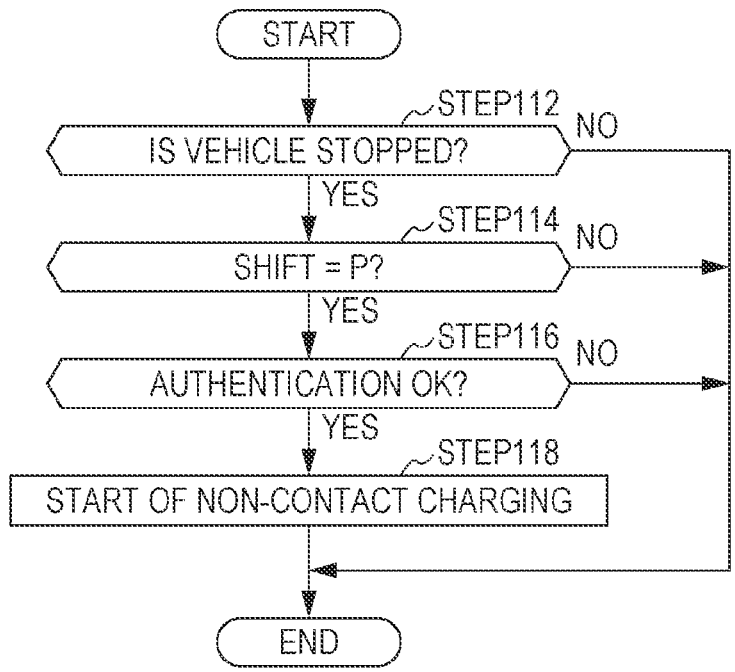
FIG. 2 is a flowchart illustrating the start of charging of the non-contact charging system according to a first embodiment.

Whether the vehicle 2 is stopped is first determined (STEP 112 in FIG. 2). For example, the output signal of a vehicle speed sensor or an acceleration sensor that is included in the sensor group 23 in the vehicle 2 is transmitted from the vehicle-mounted control device 22 to the information-obtaining unit 11 by using the information-providing unit 21, and the charging control device 12 determines whether the vehicle 2 is stopped, based on the output signal. The vehicle-mounted control device 22 may determine whether the vehicle 2 is stopped, based on the output signal of the sensor group 23, and the result of determination may be transmitted from the information-providing unit 21 to the information-obtaining unit 11. At this time, it may be determined that the position of the vehicle 2 that is stopped is a designated position at which the position of the power-transmitting unit 10 matches the position of the power-receiving unit 20, based on an image of the vehicle 2 imaged by an imaging device that is disposed around the power-transmitting unit 10.

If the result of determination is negative (NO at STEP 112 in FIG. 2), processing of the determination of whether the vehicle 2 is stopped (STEP 112 in FIG. 2) is repeated. If the result of determination is positive (YES at STEP 112 in FIG. 2), whether the position of the shift lever of the vehicle 2 is "P (Parking)" is determined (STEP 114 in FIG. 2). The determination is equivalent to determination of whether power to a drive system (a transmission, a shaft, and tires) from a power plant system (an engine and a motor) in the vehicle 2 is blocked.

For example, the output signal of a position sensor for the shift lever, the position sensor being included in the sensor group 23, is transmitted as "operation information that represents a parking operation" from the vehicle-mounted control device 22 to the information-obtaining unit 11 by using the information-providing unit 21, and the charging control device 12 determines whether the position of the shift lever of the vehicle 2 is "P", based on the output signal. The vehicle-mounted control device 22 may determine whether the position of the shift lever of the vehicle 2 is "P", based on the output signal of the sensor group 23, and the result of determination may be transmitted as the "operation information that represents the parking operation" to the information-obtaining unit 11 by using the information-providing unit 21.

If the result of determination is negative (NO at STEP 114 in FIG. 2, the processing on and after the determination of whether the vehicle 2 is stopped (STEP 112 in FIG. 2) is repeated. If the result of determination is positive (YES at STEP 114 in FIG. 2), whether the user of the vehicle 2 is a registered user is determined (STEP 116 in FIG. 2).

For example, an output signal that represents security information or the ID (the identification) of the smart key 24, which is obtained by a key sensor included in the sensor group 23, is transmitted as "authentication information for authenticating the user" from the vehicle-mounted control device 22 to the information-obtaining unit 11 by using the information-providing unit 21, and the charging control device 12 determines whether the user of the vehicle 2 is the registered user, based on the output signal. An output signal that represents the fingerprint of the user, which is obtained by a fingerprint sensor included in the sensor group 23, or the three-dimensional shape of the face of the user, which is obtained by an imaging sensor and a distance measurement sensor, may be transmitted as the authentication information (biological information for authentication) from the vehicle-mounted control device 22 to the information-obtaining unit 11 by using the information-providing unit 21, and the charging control device 12 may determine whether the user of the vehicle 2 is the registered user, based on the output signal. The vehicle-mounted control device 22 may determine whether the user of the vehicle 2 is the registered user, based on the output signal of the sensor group 23, and the result of determination may be transmitted as the authentication information to the information-obtaining unit 11 by using the information-providing unit 21.

If the result of determination is negative (NO at STEP 116 in FIG. 2), the processing on and after the determination of whether the vehicle 2 is stopped (STEP 112 in FIG. 2) is repeated. At this time, the charging control device 12 causes the power-transmitting unit 10 to keep stopping the power transmission operation. If the result of determination is positive (YES at STEP 116 in FIG. 2), the charging control device 12 causes the power-transmitting unit 10 to start the power transmission operation (STEP 118 in FIG. 2).

Subsequently, the charging efficiency calculator 121 detects the amount of power that is transmitted by the power-transmitting unit 10 and the amount of power that is received by the power-receiving unit 20 and calculates the charging efficiency, based on the amount of the power that is transmitted by the power-transmitting unit 10 and the amount of the power that is received by the power-receiving unit 20. The amount of the power that is transmitted by the power-transmitting unit 10 is detected by sensors (for example, a current sensor and a voltage sensor) that are included in the power-transmitting unit 10. The amount of the power that is received by the power-receiving unit 20 is detected by sensors (for example, a current sensor and a voltage sensor) that are included in the sensor group 23 of the vehicle 2.

Subsequently, the occupant-presuming unit 122 presumes whether the user of the vehicle 2 gets in or gets off the vehicle and/or whether the user is in the cabin space of the vehicle 2, based on an aspect of the temporal variation in the charging efficiency that is calculated by the charging efficiency calculator 121. For example, as the user gets in or gets off the vehicle 2 or an occupant of the vehicle 2 moves, the vehicle body of the vehicle 2 moves, and a relative position of the power-receiving unit 20 with respect to the power-transmitting unit 10 that is stationary with respect to the vehicle body changes. Accordingly, in the case where the aspect of the temporal variation in the charging efficiency is unstable, or a high-frequency component is contained, it is presumed that the user of the vehicle 2 is getting in or getting off the vehicle, or the user is in the cabin space of the vehicle 2. The charging control device 12 variably controls the amount of power that the power-transmitting unit 10 transmits to the power-receiving unit 20, based on the result of presumption of the occupant-presuming unit 122.

When it is presumed that the aspect of the temporal variation in the charging efficiency is unstable, and the occupant of the vehicle 2 is getting off or getting in the vehicle, or the occupant is in the cabin space of the vehicle 2, the amount of power to be transmitted can be decreased. When the aspect of the temporal variation in the charging efficiency is stable, and the occupant of the vehicle 2 is not getting off or getting in the vehicle, or no occupants are in the cabin space of the vehicle 2, the amount of power to be transmitted can be increased. This improves the charging efficiency.

Function of Stopping Charging (First Embodiment)

A first embodiment of the function of stopping charging of the battery 200 of the vehicle 2 performed by the non-contact charging system 1 having the structure described above will be described with reference to a flowchart in FIG. 3.

Figure 3:
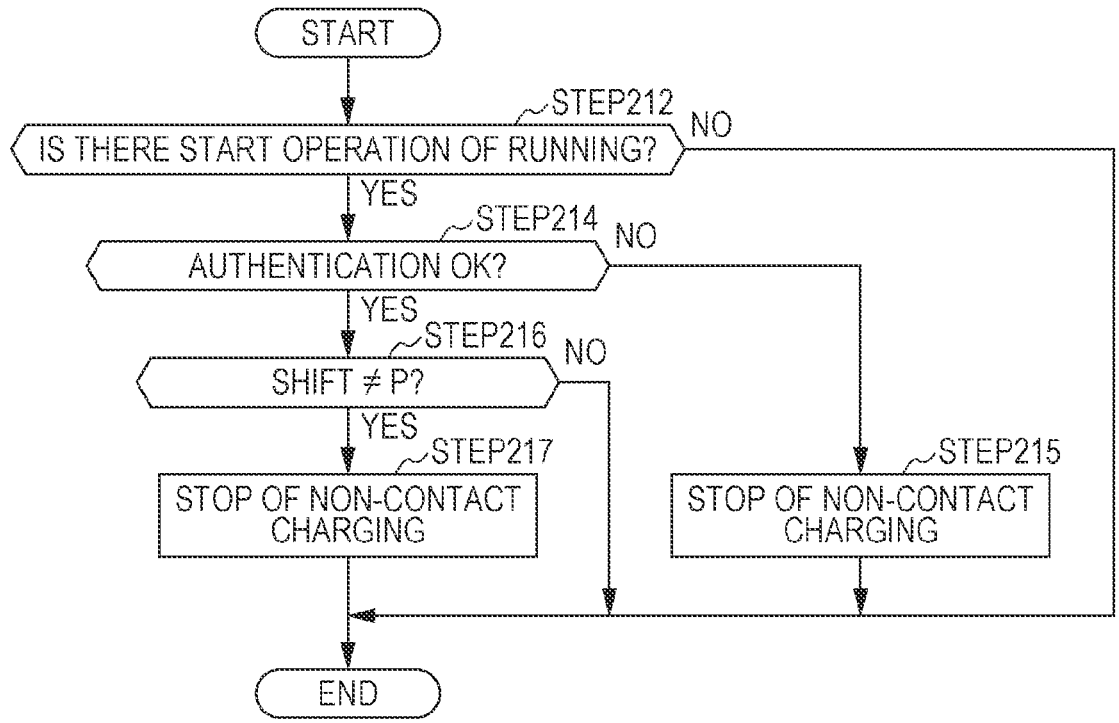
FIG. 3 is a flowchart illustrating the stop of charging of the non-contact charging system according to the first embodiment.

While the vehicle 2 is stopped and the battery 200 continues to be charged in a non-contact manner by the non-contact charging system 1, whether there is a start operation of running performed by the user of the vehicle 2 is first determined (STEP 212 in FIG. 3). For example, output signals of various sensors that are included in the sensor group 23 in the vehicle 2 are transmitted as "intention information about the intention of the user of the vehicle 2 who intends to get in the vehicle" from the vehicle-mounted control device 22 to the information-obtaining unit 11 by using the information-providing unit 21, and the charging control device 12 determines whether a parking brake is released, whether a brake pedal is pushed, whether the shift lever is touched, and/or whether the user wears a seat belt, based on the output signals, and hence, whether the user intends to get in the vehicle is determined. The vehicle-mounted control device 22 may determine whether the parking brake of the vehicle 2 is released, based on the output signal of the sensor group 23, and the result of determination may be transmitted as the "intention information about the intention of the user of the vehicle 2 who intends to get in the vehicle" to the information-obtaining unit 11 by using the information-providing unit 21. At this time, it may be determined that the position of the vehicle 2 that is stopped is the designated position at which the position of the power-transmitting unit 10 matches the position of the power-receiving unit 20, based on an image of the vehicle 2 imaged by the imaging device that is disposed around the power-transmitting unit 10.

If the result of determination is negative (NO at STEP 212 in FIG. 3), processing of the determination of whether there is the start operation of running (STEP 212 in FIG. 3) is repeated. If the result of determination is positive (YES at STEP 212 in FIG. 3), whether the user of the vehicle 2 is the registered user is determined (STEP 214 at FIG. 3 (see STEP 116 in FIG. 2)).

If the result of determination is negative (NO at STEP 214 in FIG. 3), the charging control device 12 causes the power-transmitting unit 10 to stop the power transmission operation (STEP 215 in FIG. 3). If the result of determination is positive (YES at STEP 214 in FIG. 3), whether the position of the shift lever of the vehicle 2 is a position (for example, "D (Drive)") other than "P" is determined (STEP 216 in FIG. 3). The determination of whether the position of the shift lever of the vehicle 2 is "D" is equivalent to determination of whether the power can be transmitted from the power plant system (the engine and the motor) of the vehicle 2 to the drive system (the transmission, the shaft, and the tires).

For example, the output signal of the position sensor for the shift lever, the position sensor being included in the sensor group 23, is transmitted as "operation information that represents the start operation of running" from the vehicle-mounted control device 22 to the information-obtaining unit 11 by using the information-providing unit 21, and the charging control device 12 determines whether the position of the shift lever of the vehicle 2 is a position other than "P", based on the output signal. The vehicle-mounted control device 22 may determine whether the position of the shift lever of the vehicle 2 is a position other than "P", based on the output signal of the sensor group 23, and the result of determination may be transmitted as the "operation information that represents the start operation of running" to the information-obtaining unit 11 by using the information-providing unit 21.

If the result of determination is negative (NO at STEP 216 in FIG. 3), the processing on and after the determination of whether there is the start operation of running (STEP 212 in FIG. 3) is repeated. At this time, the charging control device 12 causes the power-transmitting unit 10 to continue the power transmission operation. If the result of determination is positive (YES at STEP 216 in FIG. 3), the charging control device 12 causes the power-transmitting unit 10 to stop the power transmission operation (STEP 217 in FIG. 3).

Function of Starting Charging (Second Embodiment)

A second embodiment of the function of starting charging of the battery 200 of the vehicle 2 performed by the non-contact charging system 1 having the structure described above will be described with reference to a flowchart in FIG. 4.

Figure 4:
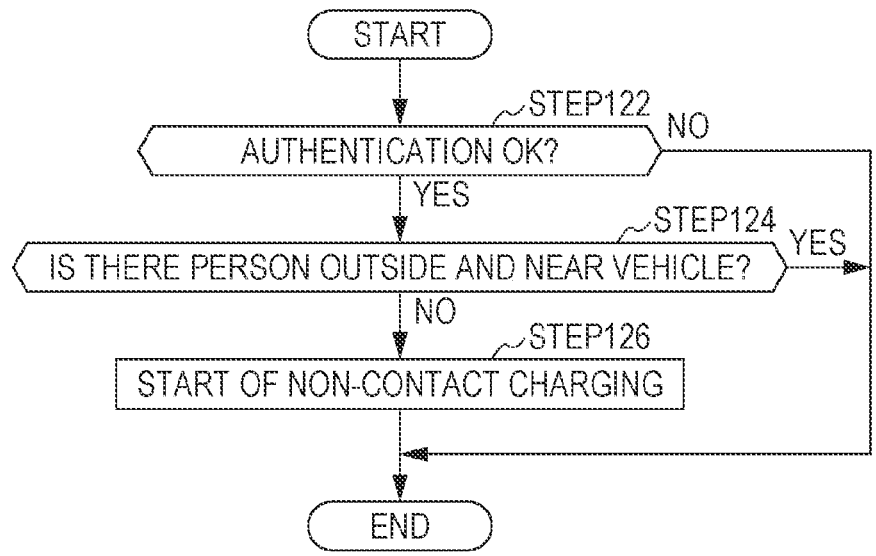
FIG. 4 is a flowchart illustrating the start of charging of the non-contact charging system according to a second embodiment.

Whether the user of the vehicle 2 is the registered user is first determined (STEP 122 in FIG. 4 (see STEP 116 in FIG. 2)).

If the result of determination is negative (NO at STEP 122 in FIG. 4), processing of the determination of whether the user of the vehicle 2 is authenticated (STEP 122 in FIG. 4) is repeated. If the result of determination is positive (YES at STEP 122 in FIG. 4), whether the distance between the vehicle 2 and the smart key 24 is equal to or more than a predetermined distance is determined (STEP 124 in FIG. 4). The determination is equivalent to determination of whether the user who carries the smart key 24 intends to get off the vehicle.

For example, the output signal of the key sensor that is included in the sensor group 23, which represents the intensity of a wireless signal that is transmitted from the smart key 24 and hence, the distance between the vehicle 2 and the smart key 24, is transmitted as "intention information that represents whether the user intends to get off the vehicle" from the vehicle-mounted control device 22 to the information-obtaining unit 11 by using the information-providing unit 21, and the charging control device 12 determines, based on the output signal, whether the distance between the vehicle 2 and the smart key 24 is equal to or more than the predetermined distance. The output signal of a distance measurement sensor that is included in the sensor group 23, which represents the distance from the vehicle 2 to an object (for example, the user) outside the vehicle 2, may be transmitted as the "intention information that represents whether the user intends to get off the vehicle" from the vehicle-mounted control device 22 to the information-obtaining unit 11 by using the information-providing unit 21. The vehicle-mounted control device 22 may determine whether the distance between the vehicle 2 and the smart key 24 is equal to or more than the predetermined distance, based on the output signal of the sensor group 23, and the result of determination may be transmitted as the intention information that represents whether the user intends to get off the vehicle to the information-obtaining unit 11 by using the information-providing unit 21.

If the result of determination is positive (YES at STEP 124 in FIG. 4), the processing on and after the determination of whether the user of the vehicle 2 is authenticated (STEP 122 in FIG. 4) is repeated. At this time, the charging control device 12 causes the power-transmitting unit 10 to keep stopping the power transmission operation. If the result of determination is negative (NO at STEP 124 in FIG. 4), the charging control device 12 causes the power-transmitting unit 10 to start the power transmission operation (STEP 126 in FIG. 4).

Subsequently, the charging control device 12 variably controls the amount of power that the power-transmitting unit 10 transmits to the power-receiving unit 20, based on the result of presumption of the occupant-presuming unit 122 as in the first embodiment.

Function of Stopping Charging (Second Embodiment)

A second embodiment of the function of stopping charging of the battery 200 of the vehicle 2 performed by the non-contact charging system 1 having the structure described above will be described with reference to a flowchart in FIG. 5.

Figure 5:
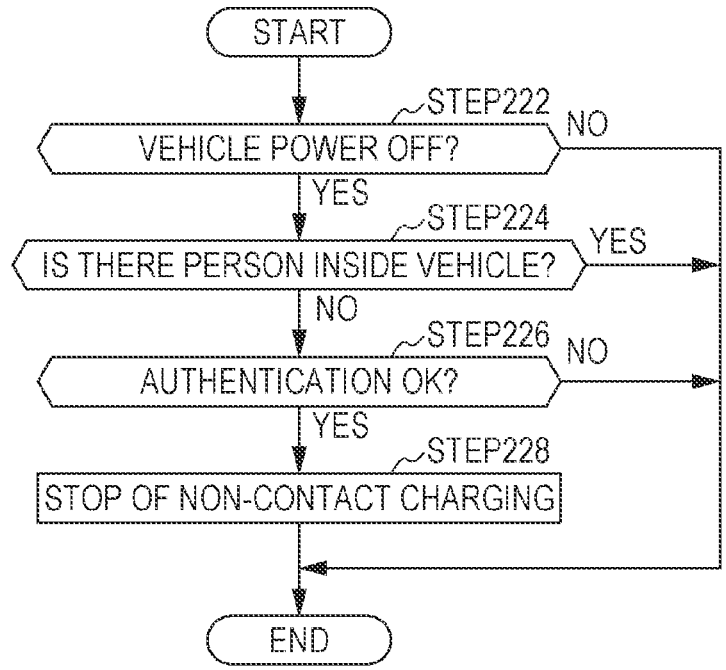
FIG. 5 is a flowchart illustrating the stop of charging of the non-contact charging system according to the second embodiment.

While the vehicle 2 is stopped and the battery 200 continues to be charged in a non-contact manner by the non-contact charging system 1, whether the power switch of the vehicle 2 is off is first determined (STEP 222 in FIG. 5). For example, the output signal of a switch sensor that is included in the sensor group 23 in the vehicle 2 is transmitted from the vehicle-mounted control device 22 to the information-obtaining unit 11 by using the information-providing unit 21, and the charging control device 12 determines, based on the output signal, whether the power switch of the vehicle 2 is off. The vehicle-mounted control device 22 may determine whether the power switch of the vehicle 2 is off, based on the output signal of the sensor group 23, and the result of determination may be transmitted to the information-obtaining unit 11 by using the information-providing unit 21.

If the result of determination is negative (NO at STEP 222 in FIG. 5), processing of the determination of whether the power switch is on or off (STEP 222 in FIG. 5) is repeated. If the result of determination is positive (YES at STEP 222 in FIG. 5), whether the user is in the cabin space of the vehicle 2 is determined (STEP 224 in FIG. 5). For example, the occupant-presuming unit 122 presumes whether the user is in the cabin space of the vehicle 2, based on the aspect of the temporal variation in the charging efficiency that is calculated by the charging efficiency calculator 121. The result of presumption may be transmitted as "intention information that represents the user is in the cabin space of the vehicle 2" or "intention information that represents the user intends to get in the vehicle" from the vehicle-mounted control device 22 to the information-obtaining unit 11 by using the information-providing unit 21. Other than this, the output signal of the acceleration sensor that is included in the sensor group 23 representing the acceleration of the vehicle body or the output signal of the imaging device (the imaging sensor) that represents the state of the cabin space of the vehicle 2 may be transmitted as the "intention information that represents the user is in the cabin space of the vehicle 2" or the "intention information that represents the user intends to get in the vehicle" from the vehicle-mounted control device 22 to the information-obtaining unit 11 by using the information-providing unit 21, and the charging control device 12 may presume whether the user is in the cabin space of the vehicle 2, based on the output signal.

The information-obtaining unit 11 may obtain, as the intention information that represents whether the user intends to get in the vehicle, information that represents the distance between the vehicle 2 and the smart key 24 is less than a predetermined distance.

If the result of determination is positive (YES at STEP 224 in FIG. 5), the processing on and after the determination of whether the power switch is on or off (STEP 222 in FIG. 5) is repeated. If the result of determination is negative (NO at STEP 224 in FIG. 5), whether the user of the vehicle 2 is the registered user is determined (STEP 226 in FIG. 5 (see STEP 116 in FIG. 2)).

If the result of determination is negative (NO at STEP 226 in FIG. 5), the processing on and after the determination of whether the power switch is on or off (STEP 222 in FIG. 5) is repeated. At this time, the charging control device 12 causes the power-transmitting unit 10 to continue the power transmission operation. If the result of determination is positive (YES at STEP 226 in FIG. 5), the charging control device 12 causes the power-transmitting unit 10 to stop the power transmission operation (STEP 228 in FIG. 5).

Effects

As for the non-contact charging system having the structure described above, the power-transmitting unit 10 starts transmitting the power to the power-receiving unit 20 of the vehicle 2 (see YES at STEP 112 in FIG. 2→YES at STEP 114→YES at STEP 116→STEP 118) if (1-1) the operation information represents the parking operation of the vehicle 2, and (3) the authentication information represents that the user of the vehicle 2 is the registered user in a state in which the vehicle 2 is stopped at a location at which the power-transmitting unit 10 is installed. The power-transmitting unit 10 starts transmitting the power to the power-receiving unit 20 of the vehicle 2 (see YES at STEP 122 in FIG. 4→NO at STEP 124→STEP 126) if (2-1) the intention information represents that the user of the vehicle 2 intends to get off the vehicle, and (3) the authentication information represents that the user of the vehicle 2 is the registered user in a state in which the vehicle 2 is stopped at the location at which the power-transmitting unit 10 is installed.

The power-transmitting unit 10 stops transmitting the power to the power-receiving unit 20 (see YES at STEP 212 in FIG. 3-4 YES at STEP 214→YES at STEP 216→STEP 217) if (1-2) the operation information represents the start operation of running of the vehicle 2, (2-2) the intention information represents that the user of the vehicle 2 intends to get in the vehicle, and (3) the authentication information represents that the user of the vehicle 2 is the registered user in a state in which the vehicle 2 is stopped at the location at which the power-transmitting unit 10 is installed. The power-transmitting unit 10 stops transmitting the power to the power-receiving unit 20 (see NO at STEP 224 in FIG. 5→YES at STEP 226→STEP 228) if (2-2) the intention information represents that the user of the vehicle 2 intends to get in the vehicle, and (3) the authentication information represents that the user of the vehicle 2 is the registered user in a state in which the vehicle 2 is stopped at the location at which the power-transmitting unit 10 is installed.

The authentication information ensures that the intention of the registered user of the vehicle 2 is reflected on the operation information and/or the intention information. Accordingly, the number of operations performed by the user decreases, charging of the battery 200 that is mounted on the vehicle 2 is prevented from being forgotten, an unregistered third person is forbidden from controlling charging of the battery 200, and the convenience of the non-contact charging system 1 and the vehicle 2 is consequently improved.

Another Embodiment of Present Disclosure

The function of the non-contact charging system 1 according to another embodiment of the present disclosure will be described with reference to FIG. 6.

The power-transmitting unit 10 starts transmitting the power to the power-receiving unit 20 of the vehicle 2, and hence, charging of the battery 200 is started (STEP 412 in FIG. 6 (see STEP 118 in FIG. 2)) if it is determined that the user of the vehicle 2 is the owner of the vehicle 2 (see YES at STEP 116 in FIG. 2), and (1-1) information about the operation of the occupant represents the parking operation of the vehicle 2 (see YES at STEP 114 in FIG. 2). The vehicle 2 may be owned by a single person or multiple people.

The power-transmitting unit 10 stops transmitting the power to the power-receiving unit 20 of the vehicle 2, and hence, charging of the battery 200 is stopped (STEP 414 in FIG. 6 (see STEP 118 in FIG. 2)) in response to (2-1) the intention information representing that the user of the vehicle 2 intends to get off the vehicle (see YES at STEP 124 in FIG. 4).

Subsequently, whether the user is in the cabin space of the vehicle 2 is determined (STEP 416 in FIG. 6 (see STEP 224 in FIG. 5)).

Subsequently, whether the user who gets off the vehicle is the owner of the vehicle 2 or another user is determined (STEP 418 in FIG. 6). For example, a process for the determination is performed based on the output signal that represents the security information or the ID (the identification) of the smart key 24 that is obtained by the key sensor that is included in the sensor group 23. Other than this, the process for the determination may be performed based on an image imaged by the imaging device that images the state of the cabin space and that is included in the sensor group 23.

If it is determined that the user who gets off the vehicle is the owner of the vehicle 2 (1 at STEP 418 in FIG. 6), owner authentication information is stored and held in a database or the storage device that is included in the charging control device 12 (STEP 420 in FIG. 6). Whether there is a person outside and near the vehicle 2 is then determined (STEP 422 in FIG. 6 (see STEP 124 in FIG. 4)).

If the result of determination is positive (YES at STEP 422 in FIG. 6), a series of the processes end. If the result of determination is negative (NO at STEP 422 in FIG. 6), whether there is the owner authentication information is determined (STEP 424 in FIG. 6).

If the presence of the owner authentication information is determined (YES at STEP 424 in FIG. 6), the power-transmitting unit 10 resumes the power transmission to the power-receiving unit 20 of the vehicle 2, and hence, charging of the battery 200 is resumed (STEP 428 in FIG. 6). If the absence of the owner authentication information is determined (NO at STEP 424 in FIG. 6), a series of the processes end.

If it is determined that the user who gets off the vehicle is not the owner of the vehicle 2 (2 at STEP 418 in FIG. 6), whether there is a person outside and near the vehicle 2 is determined (STEP 426 in FIG. 6 (see STEP 124 in FIG. 4)).

If the result of determination is positive (YES at STEP 426 in FIG. 6), a series of the processes end. If the result of determination is negative (NO at STEP 426 in FIG. 6, the power-transmitting unit 10 resumes the power transmission to the power-receiving unit 20 of the vehicle 2, and hence, charging of the battery 200 is resumed (STEP 428 in FIG. 6).

In the case where the owner of the vehicle 2 gets off the vehicle and moves away from the vehicle 2, the battery 200 mounted on the vehicle 2 can be charged even when another user is in the cabin space of the vehicle 2. This improves the convenience of the non-contact charging system 1.

According to the embodiments described above, the power-transmitting unit 10 starts transmitting the power to the power-receiving unit 20 of the vehicle 2 (see FIG. 2 and FIG. 4) if (1-1) the operation information represents the parking operation of the vehicle 2, or (2-1) the intention information represents that the user of the vehicle 2 intends to get off the vehicle. According to another embodiment, however, the power-transmitting unit 10 may start transmitting the power to the power-receiving unit 20 of the vehicle 2 if both of (1-1) and (2-1) are satisfied.

According to the embodiments described above, the power-transmitting unit 10 stops transmitting the power to the power-receiving unit 20 of the vehicle 2 (see FIG. 3 and FIG. 5) if (1-2) the operation information represents the start operation of running of the vehicle 2 and (2-2) the intention information represents that the user of the vehicle 2 intends to get in the vehicle, or if only (2-2) is satisfied. According to another embodiment, however, the power-transmitting unit 10 may stop transmitting the power to the power-receiving unit 20 of the vehicle 2 if only (2-2) is satisfied.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A non-contact charging system comprising:
   a power-transmitting unit that transmits power to a power-receiving unit mounted on a vehicle in a non-contact manner for charging a battery mounted on the vehicle;
   an information-obtaining unit that receives various kinds of information transmitted from a vehicle-mounted controller; and
   a charging controller that controls power transmission operation of the power-transmitting unit, based on the various kinds of information obtained by the information-obtaining unit,
   wherein the information-obtaining unit obtains:
   operation information representing an operation of a user of the vehicle for parking or start of running of the vehicle, and
   intention information representing intention of the user of the vehicle reflected on an action for getting off or getting in the vehicle, and
   authentication information for authenticating the user of the vehicle, and
   wherein the charging controller causes, when the vehicle is stopped at a location at which the power-transmitting unit is installed, the power-transmitting unit to start transmitting the power to the power-receiving unit on condition that the following (i) and (ii) are satisfied:
   (i) the operation information obtained by the information-obtaining unit represents a parking operation of the vehicle, and
   (ii) the authentication information represents that the user of the vehicle is a registered user,
   wherein the charging controller causes, when the power transmission from the power-transmitting unit to the power-receiving unit has been started, the power-transmitting unit to pause transmitting the power to the power-receiving unit on condition that the following (iii) is satisfied:
   (iii) the intention information obtained by the information-obtaining unit represents that the user of the vehicle intends to get off the vehicle.

2. The non-contact charging system according to claim 1, wherein
   the operation information represents that the vehicle is parked or in preparation for the start of running,
   the intention information represents at least one of a distance between the vehicle and a smart key that is carried by the user of the vehicle, or whether the user is in a cabin space of the vehicle, and
   the authentication information represents that the user of the vehicle is a registered user and represents security information for preventing the vehicle from being stolen,
   the charging control device causes, based on
   the at least one of the operation information or the intention information, and
   the authentication information which are obtained by the information-obtaining unit,
   the power-transmitting unit to start transmitting the power to the power-receiving unit on condition that the following (i) and (ii) are satisfied:
   (i) at least one of:

the operation information represents that the vehicle is parked, or the intention information represents at least one of:
   that the distance is equal to or more than a predetermined distance, or that no user is in the cabin space of the vehicle, and
(ii) the authentication information represents at least one of:
   that the user of the vehicle is the registered user, or that the security information is correct, and
wherein the charging control device causes, based on
   the at least one of the operation information or the intention information, and
   the authentication information which are obtained by the information-obtaining unit,
the power-transmitting unit to stop transmitting the power to the power-receiving unit on condition that the following (iii) and (iv) are satisfied:
(iii) at least one of:
   the operation information represents that the vehicle starts running, or the intention information represents at least one of:
      that the distance is less than a predetermined distance, or that the user is in the cabin space of the vehicle, and
(iv) the authentication information represents at least one of:
   that the user of the vehicle is correct, or that the security information is correct.

3. The non-contact charging system according to claim 1, wherein
   the charging control device comprises:
   a charging efficiency calculator that detects an amount of power transmitted by the power-transmitting unit and an amount of power received by the power-receiving unit, and calculates charging efficiency based on the amount of the power transmitted by the power-transmitting unit and the amount of the power received by the power-receiving unit, and
   an occupant-presuming unit that presumes, based on a feature of temporal variation in the charging efficiency calculated by the charging efficiency calculator, at least one of:
   whether the user of the vehicle gets in or gets off the vehicle, or whether the user is in the cabin space of the vehicle, and
   wherein the charging control device variably controls, based on a result of presumption of the occupant-presuming unit, the amount of power that the power-transmitting unit transmits to the power-receiving unit.

4. A vehicle comprising:
   a battery;
   a power-receiving unit that receives power in a non-contact manner for charging the battery from a power-transmitting unit installed at a designated location;
   an information-providing unit that provides a non-contact charging system that includes the power-transmitting unit with:
      operation information representing an operation of a user of the vehicle for parking or start of running of the vehicle, and intention information representing intention of the user of the vehicle reflected on an action for getting off or getting in the vehicle, and authentication information for authenticating the user of the vehicle; and
   a vehicle-mounted controller that causes, when the vehicle is stopped at a location at which the power-transmitting unit is installed, the power-receiving unit to start receiving the power on condition that the following (i) and (ii) are satisfied:
   (i) the operation information represents a parking operation of the vehicle, and
   (ii) the authentication information represents that the user of the vehicle is a registered user,
   wherein the vehicle-mounted controller cause, when the power receipt from the power-transmitting unit to the power-receiving unit has been started, the power-receiving unit to pause receiving the power on condition that the following (iii) is satisfied:
   (iii) the intention information represents that the user of the vehicle intends to get off the vehicle.

5. The non-contact charging system according to claim 1, wherein
   the charging control device causes the power-transmitting unit to start transmitting the power to the power-receiving unit on condition that the following (i) and (ii) are satisfied:
   (i) the operation information represents a parking operation of the vehicle and the intention information represents that the user of the vehicle intends to get off the vehicle, and
   (ii) the authentication information represents that the user of the vehicle is a registered user, and
   wherein the charging control device causes the power-transmitting unit to stop transmitting the power to the power-receiving unit on condition that the following (iii) and (iv) are satisfied:
   (iii) the operation information represents a start operation of running of the vehicle, or the intention information represents that the user of the vehicle intends to get in the vehicle, and
   (iv) the authentication information represents that the user of the vehicle is the registered user.

6. The non-contact charging system according to claim 2, wherein
   the charging control device causes the power-transmitting unit to start transmitting the power to the power-receiving unit on condition that the following (i) and (ii) are satisfied:
   (i) the operation information represents that the vehicle is parked, and the intention information represents at least one of:
      that the distance is equal to or more than a predetermined distance, or that no user is in the cabin space of the vehicle, and
   (ii) the authentication information represents at least one of:
   that the user of the vehicle is the registered user, or that the security information is correct,
   wherein the charging control device causes the power-transmitting unit to stop transmitting the power to the power-receiving unit on condition that the following (iii) and (iv) are satisfied:
   (iii) the operation information represents that the vehicle starts running, or the intention information represents at least one of:
      that the distance is less than a predetermined distance, or that the user is in the cabin space of the vehicle, and
   (iv) the authentication information represents at least one of:
   that the user of the vehicle is correct, or that the security information is correct.

7. The non-contact charging system according to claim 1, wherein
the charging control device automatically causes the power-transmitting unit to start transmitting the power to the power-receiving unit when the (i) and (ii) are satisfied, and
the charging control device automatically causes the power-transmitting unit to stop transmitting the power to the power-receiving unit when the (iii) and (iv) are satisfied.

8. A non-contact charging method for a non-contact charging in which a power-transmitting unit transmits power to a power-receiving unit mounted on a vehicle in a non-contact manner for charging a battery mounted on the vehicle, the method comprising steps of:
obtaining by using a computer:
operation information representing an operation of a user of the vehicle for parking or start of running of the vehicle, and intention information representing intention of the user of the vehicle reflected on an action for getting off or getting in the vehicle, and authentication information for authenticating the user of the vehicle;
in a state in which the vehicle is stopped at a location at which the power-transmitting unit is installed, starting by using a computer transmission of the power to the power-receiving unit on condition that the following (i) and (ii) are satisfied:
(i) the operation information represents a parking operation of the vehicle, and
(ii) the authentication information represents that the user of the vehicle is a registered user;
when the power transmission from the power-transmitting unit to the power-receiving unit has been started, pausing by using a computer transmission of the power to the power-receiving unit on condition that the following (iii) is satisfied:
(iii) the intention information represents that the user of the vehicle intends to get off the vehicle.

9. The non-contact charging system according to claim 1, wherein
the intention information represents a distance between the vehicle and a smart key that is carried by the user of the vehicle,
the authentication information represents security information for preventing the vehicle from being stolen, and
wherein the charging controller causes, when the power transmission from the power-transmitting unit to the power-receiving unit has been paused, the power-transmitting unit to resume transmitting the power to the power-receiving unit on condition that the following (iv) to (vi) are satisfied:
(iv) the intention information obtained by the information-obtaining unit represents that the user of the vehicle intends to get off the vehicle,
(v) the intention information represents that the distance between the vehicle and the smart key that is carried by the user of the vehicle is equal to or more than a threshold distance, and
(vi) the authentication information represents that the security information is correct.

10. The non-contact charging system according to claim 9, wherein the charging controller causes the power-transmitting unit to resume transmitting the power to the power-receiving unit on condition that the conditions (iv) to (vi) are satisfied even though another user is present in a cabin space of the vehicle.

* * * * *